United States Patent
Voronin et al.

(10) Patent No.: US 8,740,048 B2
(45) Date of Patent: Jun. 3, 2014

(54) THERMALLY STABLE POLYCRYSTALLINE ULTRA-HARD CONSTRUCTIONS

(75) Inventors: Georgiy Voronin, Orem, UT (US); J. Daniel Belnap, Lindon, UT (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 12/826,290

(22) Filed: Jun. 29, 2010

(65) Prior Publication Data
US 2010/0264198 A1     Oct. 21, 2010

Related U.S. Application Data

(62) Division of application No. 11/554,896, filed on Oct. 31, 2006, now Pat. No. 7,757,793.

(60) Provisional application No. 60/732,682, filed on Nov. 1, 2005.

(51) Int. Cl.
*B23K 1/00* (2006.01)
*E21B 10/00* (2006.01)
*B24D 18/00* (2006.01)

(52) U.S. Cl.
USPC ........ 228/226; 228/121; 228/122.1; 228/225; 228/262.9; 175/428; 175/434; 175/435

(58) Field of Classification Search
CPC ................. B23K 1/0008; E21B 10/55–10/56; E21B 10/567
USPC .................... 228/121, 122.1, 225, 226, 262.9; 175/327, 331, 420.2, 428, 434, 435
See application file for complete search history.

(56) References Cited

U.S. PATENT DOCUMENTS

| | | | |
|---|---|---|---|
| 3,609,818 A | 10/1971 | Wentorf | |
| 3,745,623 A | 7/1973 | Rocco et al. | |
| 3,850,591 A | 11/1974 | Wentorf | |
| 4,156,329 A * | 5/1979 | Daniels et al. | 51/295 |
| 4,186,628 A * | 2/1980 | Bonnice | 76/108.2 |

(Continued)

FOREIGN PATENT DOCUMENTS

| | | |
|---|---|---|
| CA | 2154055 | 4/2001 |
| CA | 2489709 A1 | 6/2005 |

(Continued)

OTHER PUBLICATIONS

Notice of Allowance dated Nov. 10, 2010 for related U.S. Appl. No. 11/971,893, filed Jan. 9, 2008.

(Continued)

*Primary Examiner* — Devang R Patel

(57) ABSTRACT

Thermally stable polycrystalline constructions comprise a body having a polycrystalline ultra-hard phase and a plurality of empty voids. A population of the voids can be filled with a reaction product. The body is substantially free of a catalyst material. The construction comprises a first support member attached to the body by a first braze material. A second support member is attached to the body and the first support member by a second braze material. The construction may include a third support member attached to the body that is integral or separate from one of the other support members. The braze materials used to attached the support members can be the same or different, as can be the materials used to form the different support members.

28 Claims, 9 Drawing Sheets

(56) References Cited

U.S. PATENT DOCUMENTS

| | | | |
|---|---|---|---|
| 4,199,035 A | 4/1980 | Thompson | |
| 4,200,159 A | 4/1980 | Peschel et al. | |
| 4,224,380 A | 9/1980 | Bovenkerk et al. | |
| 4,394,170 A | 7/1983 | Sawaoka et al. | |
| 4,403,015 A | 9/1983 | Nakai et al. | |
| 4,647,546 A | 3/1987 | Hall et al. | |
| 4,729,440 A | 3/1988 | Hall | |
| 4,850,523 A | 7/1989 | Slutz | |
| 4,899,922 A | 2/1990 | Slutz et al. | |
| 4,954,139 A | 9/1990 | Cerutti | |
| 5,012,863 A | 5/1991 | Springer | |
| 5,049,164 A | 9/1991 | Horton et al. | |
| 5,333,699 A | 8/1994 | Thigpen et al. | |
| 5,352,542 A | 10/1994 | Voelcker et al. | |
| 5,373,908 A | 12/1994 | Pastusek | |
| 5,429,199 A | 7/1995 | Sheirer et al. | |
| 5,487,436 A | 1/1996 | Griffin | |
| 5,533,582 A | 7/1996 | Tibbitts | |
| 5,560,440 A | 10/1996 | Tibbitts | |
| 5,737,980 A | 4/1998 | Keith et al. | |
| 5,967,249 A | 10/1999 | Butcher | |
| 6,054,693 A | 4/2000 | Barmatz et al. | |
| 6,213,380 B1 * | 4/2001 | Collins et al. | 228/122.1 |
| 6,541,124 B1 | 4/2003 | Suggs | |
| 6,742,611 B1 | 6/2004 | Illerhaus et al. | |
| 7,320,505 B1 | 1/2008 | Hall et al. | |
| 7,347,292 B1 | 3/2008 | Hall et al. | |
| 7,389,834 B1 | 6/2008 | Kembaiyan | |
| 7,487,849 B2 | 2/2009 | Radtke | |
| 7,625,521 B2 | 12/2009 | Izaguirre et al. | |
| 7,703,555 B2 | 4/2010 | Overstreet | |
| 7,757,793 B2 | 7/2010 | Voronin | |
| 7,909,121 B2 | 3/2011 | Voronin et al. | |
| 7,997,358 B2 | 8/2011 | Izaguirre et al. | |
| 7,997,359 B2 | 8/2011 | Eason et al. | |
| 2003/0079916 A1 | 5/2003 | Oldham | |
| 2003/0084894 A1 | 5/2003 | Sung | |
| 2004/0244540 A1 | 12/2004 | Oldham et al. | |
| 2004/0245022 A1 | 12/2004 | Izaguirre et al. | |
| 2005/0087371 A1 | 4/2005 | Kembaiyan et al. | |
| 2005/0089440 A1 * | 4/2005 | Kembaiyan | 420/502 |
| 2005/0103533 A1 | 5/2005 | Sherwood, Jr. et al. | |
| 2005/0230156 A1 * | 10/2005 | Belnap et al. | 175/375 |
| 2005/0263328 A1 | 12/2005 | Middlemiss | |
| 2006/0191723 A1 | 8/2006 | Keshavan | |
| 2006/0254830 A1 | 11/2006 | Radtke | |
| 2007/0023206 A1 * | 2/2007 | Keshavan et al. | 175/374 |
| 2007/0056776 A1 | 3/2007 | Overstreet | |
| 2007/0079994 A1 | 4/2007 | Middlemiss | |
| 2007/0102199 A1 | 5/2007 | Smith et al. | |
| 2007/0205023 A1 | 9/2007 | Hoffmaster | |
| 2007/0278017 A1 | 12/2007 | Shen et al. | |
| 2008/0029310 A1 | 2/2008 | Stevens et al. | |
| 2008/0128176 A1 | 6/2008 | Choe | |
| 2008/0164070 A1 | 7/2008 | Keshavan | |
| 2008/0230279 A1 | 9/2008 | Bitler et al. | |
| 2009/0102588 A1 | 4/2009 | Sigler | |
| 2009/0173014 A1 | 7/2009 | Voronin et al. | |
| 2009/0173547 A1 | 7/2009 | Voronin | |
| 2009/0173548 A1 | 7/2009 | Voronin | |
| 2010/0187020 A1 | 7/2010 | Zhang | |
| 2010/0314176 A1 | 12/2010 | Zhang et al. | |
| 2011/0024200 A1 | 2/2011 | DiGiovanni et al. | |
| 2011/0031031 A1 | 2/2011 | Vempati et al. | |
| 2011/0127088 A1 | 6/2011 | Voronin et al. | |

FOREIGN PATENT DOCUMENTS

| | | |
|---|---|---|
| EP | 0 295 151 A2 | 12/1988 |
| FR | 2774420 A1 | 6/1999 |
| GB | 2163144 | 2/1986 |
| GB | 2337063 A | 11/1999 |
| GB | 2351987 A1 | 1/2001 |
| GB | 2422394 A | 7/2006 |
| GB | 2427215 A | 12/2006 |
| GB | 2431948 A1 | 5/2007 |
| GB | 2471412 | 2/2011 |
| GB | 2471413 | 2/2011 |
| JP | 2000000686 A | 1/2000 |
| SU | 1803518 A | 3/1993 |
| WO | 9845091 A2 | 10/1998 |
| WO | 9929465 | 6/1999 |

OTHER PUBLICATIONS

Examination Report dated Jun 28, 2010 for corresponding GB application No. 0621679.0 filed Nov 1, 2006.

Response dated Sep. 28, 2010 to Examination Report dated Jun 28, 2010 for corresponding GB application No. 0621679.0 filed Nov 1, 2006.

Non-Final Office Action dated Aug. 30, 2010 for related U.S. Appl. No. 11/971,896, filed Jan. 9, 2008.

Response dated Dec. 30, 2010 to Non-Final Office Action dated Aug. 30, 2010 for related U.S. Appl. No. 11/971,896, filed Jan. 9, 2008.

Final Office Action dated Feb. 17, 2011 in related U.S. Appl. No. 11/971,896.

Response to Final Office Action filed May 17, 2011 in related U.S. Appl. No. 11/971,896.

Official Letter dated Nov. 2, 2009 issued in related application IE 2008/1012.

Advisory Action dated Jun. 8, 2011, in related U.S. Appl. No. 11/971,896.

Non-Final Office Action dated May 19, 2011, in related U.S. Appl. No. 13/024,747.

Final Office Action Dated Nov. 2, 2011, in related U.S. Appl. No. 13/024,747.

Non-Final Office Action dated Nov. 13, 2009 in related U.S. Appl. No. 11/971,893.

Search Report dated Feb. 21, 2007, in related App. No. GB0621679.0 (3 pages).

Examination Report dated Feb. 25, 2010 for related application GB0621679.0 (2 pages).

Response dated Jun. 25, 2010 to Examination Report dated Feb. 25, 2010 in related application GB0621679.0.

Search Report dated Mar. 18, 2009 in related application GB 0900059.7.

Non-Final Rejection dated Sep. 24, 2009 in related U.S. Appl. No. 11/554,896.

Response filed Dec. 22, 2009 to Non-Final Rejection dated Sep. 24, 2009 in related U.S. Appl. No. 11/554,896.

Search Report dated Apr. 8, 2009 in corresponding application GB0900061.3.

Amendment to Search Report dated Aug. 5, 2009 in corresponding application GB 0900061.3.

Examination Report dated Jul. 28, 2010 in related application GB0621679.0.

Response dated Aug. 30, 2010 to Non-Final Office Action dated Apr. 29, 2010 in related U.S. Appl. No. 11/971,893.

Non-Final Office Action dated Apr. 29, 2010 in related U.S. Appl. No. 11/971,893.

Notice of Allowance dated Mar. 11, 2010 in related U.S. Appl. No. 11/554,896.

Response dated Mar. 1, 2010 to Official Letter dated Nov. 2, 2009 from Irish Patent Office in related Irish application 2008/1012.

Response dated Feb. 15, 2010 to Non-Final Office Action dated Nov. 13, 2009 in related U.S. Appl. No. 11/971,893.

Non-Final Office Action dated Aug. 30, 2010 in related U.S. Appl. No. 11/971,896.

Response dated Dec. 30, 2010 to Office Action in related U.S. Appl. No. 11/971,896.

Amendment after Final filed May 17, 2011 in related U.S. Appl. No. 11/971,896.

Non-Final Office Action dated Mar. 30, 2009 in related U.S. Appl. No. 11/554,896.

Response dated Jul. 1, 2009 to Office Action dated Mar. 30, 2009 in related U.S. Appl. No. 11/554,896.

(56) References Cited

OTHER PUBLICATIONS

Notice of Allowance dated Nov. 10, 2010 in related U.S. Appl. No. 11/971,893.
Response dated Aug. 19, 2011 to Office Action in related U.S. Appl. No. 13/024,747.
Examiner Interview Summary dated Mar. 11, 2010 in related U.S. Appl. No. 11/554,896.
Examination Report dated Sep. 1, 2011 in related application GB0900059.7.
Examination Report of Canadian Application Serial No. 2,567,011 dated Sep. 14, 2012: pp. 1-3.
Examination Report of Canadian Application No. 2,567,011 dated May 17, 2013: pp. 1-2.
Combined Search and Examination Report issued in GB1016297.2 on Oct. 25, 2010; 3 pages.
Combined Search and Examination Report issued in GB1201558.2 on Mar. 5, 2012; 5 pages.
Mizuhara, et al., "High-reliability Joining of Ceramic to Metal", Ceramic Bulletin, vol. 68, No. 9, 1989, pp. 1591-1599.

* cited by examiner

THERMALLY STABLE POLYCRYSTALLINE ULTRA-HARD CONSTRUCTIONS

RELATION TO COPENDING PATENT APPLICATION

This patent application is a divisional of U.S. patent application Ser. No. 11/554,896, filed Oct. 31, 2006 which claims priority to U.S. Provisional Patent Application Ser. No. 60/732,682, filed on Nov. 1, 2005, which is incorporated herein by reference.

FIELD OF THE INVENTION

This invention generally relates to polycrystalline ultra-hard constructions and, more particularly, to thermally stable polycrystalline diamond constructions that are specially engineered to have properties of improved bond strength and reduced residual thermal stress when compared to conventional thermally stable polycrystalline diamond compact constructions.

BACKGROUND OF THE INVENTION

Polycrystalline ultra-hard constructions, such as polycrystalline diamond (PCD) materials and PCD elements formed therefrom, are well known in the art. Conventional PCD is formed by combining diamond grains with a suitable solvent catalyst material to form a mixture. The mixture is subjected to processing conditions of extremely high pressure-high temperature, where the solvent catalyst material promotes desired intercrystalline diamond-to-diamond bonding between the grains, thereby forming a PCD structure. The resulting PCD structure produces enhanced properties of wear resistance and hardness, making PCD materials extremely useful in aggressive wear and cutting applications where high levels of wear resistance and hardness are desired.

Solvent catalyst materials typically used for forming conventional PCD include metals selected from Group VIII of the Periodic table, with cobalt (Co) being the most common. Conventional PCD can comprise from 85 to 95% by volume diamond and a remaining amount of the solvent catalyst material. The solvent catalyst material is disposed within interstitial regions of the PCD microstructure that exist between the bonded together diamond grains or crystals.

A problem known to exist with such conventional PCD materials is thermal degradation due to differential thermal expansion characteristics between the interstitial solvent catalyst material and the bonded together diamond crystals. Such differential thermal expansion is known to occur at temperatures of about 400° C., causing ruptures to occur in the diamond-to-diamond bonding, and resulting in the formation of cracks and chips in the PCD structure.

Another problem known to exist with conventional PCD materials also relates to the presence of the solvent catalyst material in the interstitial regions and the adherence of the solvent catalyst to the diamond crystals that is known to cause another form of thermal degradation. Specifically, the solvent catalyst material is known to cause an undesired catalyzed phase transformation in diamond (converting it to carbon monoxide, carbon dioxide, or graphite) with increasing temperature, thereby limiting practical use of the PCD material to about 750° C.

Attempts at addressing such unwanted forms of thermal degradation in PCD are known in the art. Generally, these attempts have involved treating the PCD to remove the solvent catalyst material therefrom. PCD materials that have been treated in this manner are referred to as being thermally stable. Such thermally stable polycrystalline diamond materials have a material microstructure comprising a polycrystalline matrix phase of bonded together diamond crystals, and a remaining phase comprising a plurality of pores or voids interposed between the diamond crystals resulting from the removal of the solvent catalyst material.

Such thermally stable polycrystalline diamond material formed from PCD typically does not include a metallic substrate attached thereto, as any metal substrate is either removed from the PCD before treatment, or if not removed beforehand, falls away from the PCD body after treatment by the removal of the solvent metal catalyst at the interface previously joining the PCD body to the substrate.

A problem known to exist with using such thermally stable polycrystalline diamond materials in conjunction with known cutting and/or wear applications is the need to attach the thermally stable polycrystalline diamond material to a substrate to provide a construction suitable for attachment with a desired cutting or wear device. However, such thermally stable polycrystalline diamond materials typically have a poor wetablity and have a coefficient of thermal expansion that is significantly different from that of conventional substrate materials, thereby making it very difficult to bond the thermally stable polycrystalline diamond material to such conventionally used substrates.

Attempts to form compact constructions have been made by brazing the thermally stable polycrystalline diamond body to a desired substrate. However, such compact constructions comprising the thermally stable polycrystalline diamond material brazed together with a substrate, e.g., cemented tungsten carbide, are known to be easily fractured along the braze joint, which fracture is believed to be caused by the formation of voids and residual thermal stresses in the braze joint during the process of brazing. Thus, compacts formed by brazing such thermally stable polycrystalline diamond material to a substrate are known to be vulnerable to fatigue and/or impact damage at the interface during operation. Accordingly, compacts formed in this manner typically have a reduced service life that is not desired in most cutting and/or wear applications.

An alternative approach for using such conventional thermally stable polycrystalline diamond materials as wear and/or cutting materials has been to avoid the use of a substrate and attach the thermally stable polycrystalline diamond to the intended cutting and/or wear device directly, i.e., without the use of a substrate. However, because such thermally stable polycrystalline diamond materials are devoid of either a metallic material or a metallic substrate, they cannot (e.g., when configured as a cutter for use in a subterranean drill bit) be attached to a drill bit by conventional brazing process. Thus, use of such thermally stable polycrystalline diamond materials in this particular application necessitates that the thermally stable polycrystalline diamond material itself be mounted to the drill bit by mechanical or interference fit during manufacturing of the drill bit, which is labor intensive, time consuming, and which does not provide a most secure method of attachment.

It is, therefore, desired that a thermally stable polycrystalline construction be provided in the form of a compact that includes a substrate, and that has properties of improved bond strength when compared to the above-noted conventional thermally stable polycrystalline diamond compact constructions. It is also desired that such thermally stable polycrystalline constructions be provided in a manner that display reduced residual thermal stress when compared to conventional thermally stable polycrystalline diamond compact constructions.

SUMMARY OF THE INVENTION

Thermally stable polycrystalline ultra-hard constructions comprise a body having a material microstructure including a polycrystalline phase. The body can also comprise a plurality of voids interposed within the polycrystalline phase and/or can comprise a reaction product with the polycrystalline phase disposed within at least a population of the empty voids. In an example embodiment, the polycrystalline phase comprises bonded together diamond crystals, and is substantially free of a catalyst material, e.g., such as a solvent metal catalyst used to form a traditional polycrystalline diamond compact.

The construction comprises a first support member that is attached to one region of the body by a first braze material. The construction also comprises a second or sidewall support member that is attached to another region of the body and to the first support member by a second braze material. In an example embodiment, the first and second braze materials can be the same or different, and at least one of the first and second braze materials are formed from a material that reacts with the body and forms a reaction product therewith. In an example embodiment, the first braze material is formed from a material different from the second braze material, and the first braze material has a melting or liquidus temperature that is relatively higher than that of the second braze material.

The construction may include a third or front support member that is attached to yet another region of the body, e.g., to a front side surface of the body, and that is connected with the second support member. The third support member can be separate or integral with the second support member. If embodied as a separate member, the third support member can be attached to the second support member by a third braze material. The third braze material can be the same or different from that of the first and second braze materials. The first, second and third support members can be formed form the same or different materials.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Thermally stable polycrystalline ultra-hard (TSP) constructions of this invention are specifically engineered having a polycrystalline ultra-hard body that is attached to two or more support members by one or more types of braze materials to thereby enable such TSP constructions to be readily attached to a tooling, cutting and/or wear device, e.g., to a bit used for drilling subterranean formations when the TSP construction is provided in the form of a cutting element, by conventional means such as by brazing and the like. In an example embodiment, the polycrystalline ultra-hard body comprises bonded together diamond grains or crystals, and is substantially free of a solvent catalyst material that was used to form the body. TSP constructions of this invention are specially designed to provide properties of improved bond strength and reduced residual thermal stress when compared to conventional thermally stable polycrystalline diamond compact constructions, thereby providing improved service life.

As used herein, the term "PCD" is understood to refer to polycrystalline diamond that has been formed, at high pressure-high temperature (HPHT) conditions, through the use of a metal solvent catalyst, such as those metals included in Group VIII of the Periodic table. As used herein, the term "TSP" is understood to refer to a body of material having a microstructure characterized by: 1) a polycrystalline phase comprising bonded together ultra-hard particles and a plurality of voids or pores in the polycrystalline phase; or 2) a polycrystalline phase comprising bonded together ultra-hard particles and a second phase comprising a reaction product with the polycrystalline phase. In an example embodiment, the reaction product can be formed by reacting a non-solvent catalyst material known to form a relatively thermal stable compound with the polycrystalline phase. For example, when the polycrystalline phase is diamond, the reaction product or compound can be formed using a non-solvent catalyst material at temperatures above about 700° C.

The polycrystalline phase is selected from the group including diamond, polycrystalline diamond, cubic boron nitride (cBN), polycrystalline cubic boron nitride (PcBN), and mixtures thereof. When the polycrystalline phase comprises bonded together diamond crystals, and the body further comprises a plurality of voids or empty pores, the voids or pores are formed by removing a solvent catalyst material that was used to facilitate diamond bonding during formation of the polycrystalline phase.

Figure 1:
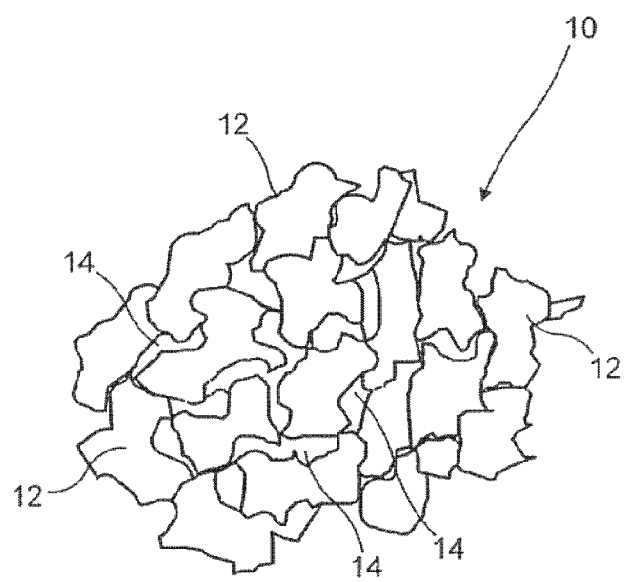
FIG. 1 is schematic view taken from a region of a thermally stable polycrystalline ultra-hard material of this invention.

FIG. 1 illustrates a region of a TSP material 10 used with TSP constructions of this invention. The TSP material includes a polycrystalline material phase 12 and a plurality of voids or pores 14 within the polycrystalline phase. In an example embodiment, the polycrystalline phase 12 comprises intercrystalline bonded diamond that is formed by bonding together adjacent diamond grains or crystals at HPHT conditions. Such bonding together of the diamond grains at HPHT is facilitated by the use of an appropriate catalyst material. In an example embodiment, the catalyst material is a metal solvent catalyst. In such example embodiment, the plurality of voids or pores 14 is disposed interstitially between the bonded together diamond grains.

Diamond grains useful for forming TSP materials used with TSP constructions of this invention include synthetic diamond powders having an average diameter grain size in the range of from submicrometer in size to 100 micrometers, and more preferably in the range of from about 5 to 80 micrometers. The diamond powder can contain grains having a mono or multi-modal size distribution. In an example embodiment, the diamond powder has an average particle grain size of approximately 20 micrometers. In the event that diamond powders are used having differently sized grains, the diamond grains are mixed together by conventional process, such as by ball or attrittor milling for as much time as necessary to ensure good uniform distribution.

The diamond grain powder is preferably cleaned, to enhance the sinterability of the powder by treatment at high temperature, in a vacuum or reducing atmosphere. The diamond powder mixture is loaded into a desired container for placement within a suitable HPHT consolidation and sintering device.

The diamond powder may be combined with a desired catalyst material, e.g., a solvent metal catalyst, in the form of a powder to facilitate diamond bonding during the HPHT process and/or the catalyst material can be provided by infiltration from a substrate positioned adjacent the diamond powder. Suitable catalyst materials include metal solvent catalysts such as those selected from Group VIII elements of the Periodic table. A particularly preferred metal solvent catalyst is cobalt (Co).

Suitable substrates useful for infiltrating the catalyst material can include those used to form conventional PCD materials, including carbides, nitrides, carbonitrides, ceramic materials, metallic materials, cermet materials, and mixtures thereof. A feature of the substrate is that it include a metal solvent catalyst that is capable of melting and infiltrating into the adjacent volume of diamond powder to facilitate the formation of diamond-to-diamond intercrystalline bonding during the HPHT process. As noted above, suitable metal solvent catalyst materials include those selected from Group VIII elements of the Periodic table. A particularly preferred metal solvent catalyst is cobalt (Co), and a preferred substrate material is cemented tungsten carbide (WC—Co).

Alternatively, the diamond powder mixture can be provided in the form of a green-state part or mixture comprising diamond powder that is contained by a binding agent, e.g., in the form of diamond tape or other formable/confirmable diamond mixture product to facilitate the manufacturing process. In the event that the diamond powder is provided in the form of such a green-state part it is desirable that a preheating step take place before HPHT consolidation and sintering to drive off the binder material. In an example embodiment, the PCD material resulting from the above-described HPHT process may have a diamond volume content in the range of from about 85 to 95 percent.

The diamond powder mixture or green-state part is loaded into a desired container for placement within a suitable HPHT consolidation and sintering device. The HPHT device is activated to subject the container to a desired HPHT condition to effect consolidation and sintering of the diamond powder. In an example embodiment, the device is controlled so that the container is subjected to a HPHT process having a pressure of approximately 5,500 MPa and a temperature of from about 1,350° C. to 1,500° C. for a predetermined period of time. At this pressure and temperature, the solvent metal catalyst melts and infiltrates into the diamond powder mixture, thereby sintering the diamond grains to form conventional PCD.

While a particular pressure and temperature range for this HPHT process has been provided, it is to be understood that such processing conditions can and will vary depending on such factors as the type and/or amount of metal solvent catalyst used, as well as the type and/or amount of diamond powder used to form the PCD region. After the HPHT process is completed, the container is removed from the HPHT device, and the so-formed PCD material is removed from the container.

In the event that a substrate is used during the HPHT process, as a source of the catalyst material, it may be removed prior to treating the PCD material to remove the catalyst material therefrom to form the TSP material.

The term "removed" as used with reference to the catalyst material after the treatment process is understood to mean that a substantial portion of the catalyst material no longer resides within the polycrystalline matrix material. However, it is to be understood that some small amount of catalyst material may still remain in the microstructure of the TSP material within the interstitial regions and/or adhered to the surface of the diamond crystals. Under some thermodynamic circumstances, some small amount of catalyst material may react with other compounds present in the material during sintering. In such circumstances, both the catalytic function and the ability of a post-sintering operation to remove this reacted compound are greatly compromised. Accordingly, such small amount of the catalyst material may reside within the polycrystalline matrix material after the treatment process. Additionally, the term "substantially free", as used herein to refer to the remaining TSP material after the treatment process, is understood to mean that there may still be some small amount of catalyst material remaining within the TSP material as noted above.

In an example embodiment, the PCD material is treated to render the entire body substantially free of the catalyst material. This can be done, for example, by removing substantially all of the catalyst material therefrom by suitable process. Example processes useful for removing the second phase material include chemical treatment such as by acid leaching or aqua regia bath, electrochemically such as by electrolytic process, by liquid metal solubility, or by liquid metal infiltration that sweeps the existing catalyst material away and replaces it with another noncatalyst material during a liquid phase sintering process, or by combinations thereof. In an example embodiment, the catalyst material is removed from the PCD material by an acid leaching technique, such as that disclosed for example in U.S. Pat. No. 4,224,380.

Alternatively, TSP materials useful for forming TSP constructions of this invention may have a material microstructure comprising a polycrystalline phase and a second phase that is a reaction product of the polycrystalline phase and another material, e.g., a non-solvent catalyst material. Since this type of TSP material does not include a metal solvent catalyst, there is no need for treating as described above. As used herein, the term "non-solvent catalyst" is understood to refer to those types of materials typically used to form PCD during HPHT conditions, and/or that can operate to cause an unwanted change in the nature of the polycrystalline material during operation of the TSP construction in a wear or cutting operation. For example, when the polycrystalline material is polycrystalline diamond, it is desired that the non-solvent catalyst be a material that does not cause graphitization of the polycrystalline diamond during operating temperatures.

Example materials useful for forming the non-solvent catalyst in such TSP material embodiment include those materials capable of reacting with the polycrystalline phase material to form a compound that can bond together with the polycrystalline phase material. In an example embodiment, wherein the polycrystalline phase material is polycrystalline diamond, the non-solvent catalyst is silicon (Si) that reacts with the carbon in the polycrystalline diamond to form silicon carbide (SiC).

Generally speaking, TSP constructions of this invention comprise a TSP material, as described above, that is attached to two or more support members by the use of one or more braze materials. The configuration of the support members, the materials used to form the same, and the type of braze materials that are used are specifically selected to provide a TSP construction having properties of improved mechanical bond strength and reduced residual thermal stress when compared to conventional thermally stable polycrystalline diamond compact constructions.

Figure 2A:
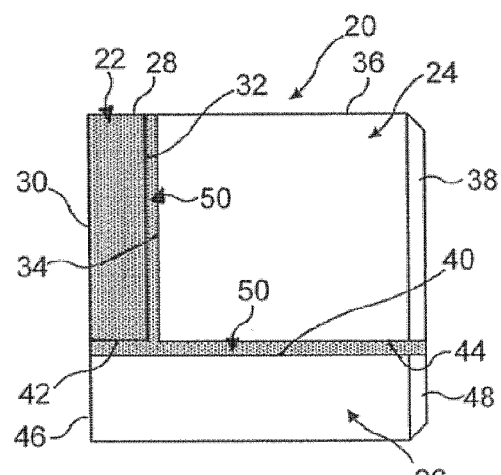
FIGS. 2A to 2D are cross-sectional side and top plan views of an example embodiment thermally stable polycrystalline ultra-hard construction of this invention comprising backside and sidewall support members.

FIGS. 2A to 2D illustrate example embodiment TSP constructions 20 of this invention generally comprising a TSP material 22 that is attached both to a first or backside support member 24 and a second or sidewall support member 26. Referring to FIG. 2A, the TSP material 22 is configured in the form of a tablet having a outside wall section 28, defining a least a section of an outer radial edge of the TSP material, and having a thickness that extends axially from a front side surface 30 to a backside surface 32 of the TSP material.

It is to be understood that the radial and axial dimensions of the TSP material can and will vary depending on the particular tooling, cutting and/or wear application. In an example embodiment, for purposes of reference, the TSP material may have a diameter in the range of from about 9 mm to 22 mm, although there are niche applications for TSP material diameters of from about 6 mm and 26 mm as well. Example embodiment TSP constructions can include TSP materials within the above-noted diameter ranges and having a thickness of from about 0.5 mm to 4.0 mm. Again, it is to be understood that these ranges are provided only for purposes of reference and example and are not intended to be limiting of TSP constructions of this invention.

The backside support member 24 is attached to the backside surface 32 of the TSP material along a front side surface 34 that is preferably sized and configured to support the entire backside surface 32 of the TSP material. The backside support member 24 comprises an outside wall section 36 that is preferably sized and configured to match the TSP material outside wall section 28. The backside support member 24 has an axial thickness or length that extends from its front side surface 34 to a backside surface 38. It is to be understood that the radial and axial dimensions of the backside support member can and will vary depending on the particular cutting and/or wear application.

The sidewall support member 26 includes an inside wall surface 40 that is attached both to an inside wall surface 42 of the TSP material 22, and to an inside wall surface 44 of the backside support member 24. In a preferred embodiment, the backside support member inside wall surface 40 is sized and configured to support the entire backside inside wall surface 42 of the TSP material. The sidewall support member 26 has an axial length, extending from a front side surface 46 to a backside surface 48. In an example embodiment, the sidewall support member may have an axial length that extends along the entire portion of the TSP material inside wall surface 42, and along all or part of the backside support member inside wall surface 44. In the embodiment illustrated in FIG. 2A, the backside support member has an axial length that extends from the front side surface 30 of the TSP material to the backside support member backside surface 28.

In the example embodiment illustrated in FIGS. 2A to 2D, the TSP material 22 is attached to the backside and sidewall support members 24 and 26, and the backside and sidewall support members are attached to one another, through the use of a braze material 50. The type of braze material used for attaching the TSP material to the support members, and attaching the support members together, can and will vary depending on such factors as the types of materials used for forming the TSP material and/or the types of material used for to form the backside and sidewall support members.

Braze materials useful for forming TSP constructions of this invention and for attaching the TSP material and/or the support members together include those selected from the group comprising Ag, Au, Cu, Ni, Pd, B, Cr, Si To, Mo, V, Fe, Al, Mn, Co, and mixtures and alloys thereof. Alloys comprising two or more of the above-identified materials are especially desired and useful for this purpose. Brazing materials useful for attaching the TSP and/or the support members together include those characterized as being "active" and "nonactive." "Active" braze materials include are those that react with the TSP material, and for this reason are preferably used for attaching the TSP material to the support members, while "nonactive" braze materials are those that do not necessarily react with the TSP material and for this reason may be useful for attaching support members together. While the above preferred uses of "active" and "nonactive" braze materials have been described, it is to be understood that this is a preferred use and that the braze materials described herein can be used to attach either or both the TSP material and/or the support members together.

Example "active" braze materials useful for forming TSP constructions include those having the following composition and liquidus temperature (LT) and solidus temperatures (ST):

81.25 Au, 18 Ni, 0.75 Ti, LT=960 C, ST=945 C;
  82 Au, 16 Ni, 0.75 Mo, 1.25 V LT=960 C, ST=940 C;
  20.5 Au, 66.5 Ni, 2.1 B, 5.5 Cr, 3.2 Si, 2.2 Fe, LT=971 C, ST=941 C;
  56.55 Ni, 30.5 Pd, 2.45 B, 10.5 Cr, LT=977, ST=941;
  92.75 Cu, 3 Si, 2 Al, 2.25 Ti, LT=1,024 C, ST=969;
  82.3 Ni, 3.2 B, 7 Cr, 4.5 Si, 3 Fe, LT=1,024; ST=969; and
  96.4 Au, 3 Ni, 0.6 Ti, LT=1,030, ST=1.003.

Example "nonactive" braze materials useful for forming TSP constructions include those having the following composition and liquid temperature (LT) and solid temperature (ST):

52.5 Cu, 9.5 Ni, 38 Mn, LT=925, ST=880 C;
  31 Au, 43.5 Cu, 9.75 Ni, 9.75 Pd, 16 Mn, LT=949, ST=927;
  54 Ag, 21 Cu, 25 Pd, LT=950 C, ST=900;
  67.5 Cu, 9 Ni, 23.5 Mn, LT=955, ST=925;
  58.5 Cu, 10 Co, 31.5 Mn, LT=999, ST=896;
  35 Au, 31.5 Cu, 14 Ni, 10 Pd, 9.5 Mn, LT=1,004, ST=971;
  25 Su, 37 Cu, 10 Ni, 15 Pd, 13 Mn, LT=1,013, ST=970; and
  35 Au, 62 Cu, 3 Ni, LT=1,030, ST=1,000.

Figure 9:
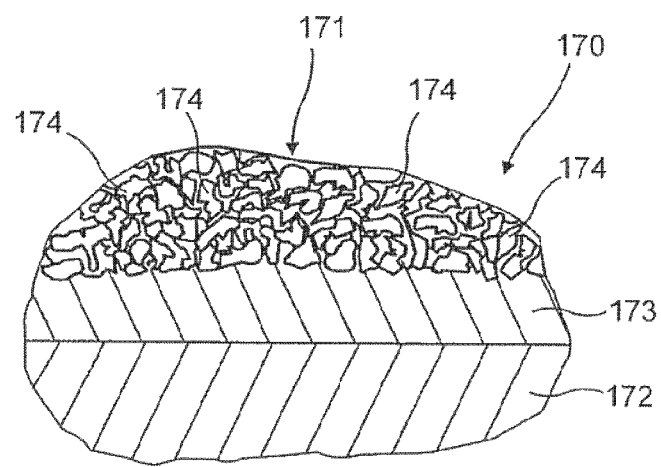
FIG. 9 is a schematic view taken from a region of a thermally stable polycrystalline ultra-hard construction comprising a polycrystalline ultra-hard body that is joined to a support member by a braze material.

As noted above, braze materials useful for forming TSP constructions can be active and react with the TSP material. In an example embodiment, where such an active braze is used, the braze can react with the TSP material to form a reaction product therein and/or between it and the support member. FIG. 9 illustrates a region 170 of an example embodiment TSP construction of this invention and, more specifically, a region where the TSP material 171 is positioned adjacent a support member 172 after the two have been brazed together.

The TSP material 170 and support member 172 are joined together by an active braze material 173. The region adjacent the support member has a material microstructure comprising a polycrystalline phase of bonded together particles or crystals 174, and braze material 173 disposed within the interstitial voids or pores and/or positioned along an interface surface of the TSP material. Further, all or a portion of the braze material disposed within and/or positioned adjacent the TSP material has reacted with the particles or crystals to form a reaction product. The presence of such reaction product can operate to enhance the thermal and/or mechanical properties of the TSP material.

In an example embodiment, where the braze material includes silicon and the TSP material comprises a polycrystalline diamond ultra-hard phase, the silicon reacts with the carbon in the diamond to form SiC. The SiC reaction product has thermal expansion properties that are closer to the polycrystalline diamond phase than that of the catalyst material that was present before removal treatment. This operates to both improve thermal expansion compatibility between the TSP material and the support member. Additionally, the SiC reaction product operates to bond together adjacent diamond crystals within the TSP material, thereby operating to improve the overall mechanical strength of the TSP material within this region. It is to be understood that the extent that such region is formed within the TSP material, and the location of such region, can and will vary depending on a number of different factors such as the type of materials used to form the TSP material, the type of binder alloy that is used, the placement position of the support members, the brazing conditions, and the like.

In the event that a TSP material is used, comprising a polycrystalline material phase and a reaction product between it a non-catalyst material, the braze material can be an active braze material that reacts with the polycrystalline material phase and/or with the reaction product to form a reaction product having the same desired properties as noted above.

A further advantage of using an active braze material for joining the TSP material and the support member is that such active braze material can react with oxide materials formed on the surface of the TSP material, which oxide materials are known to act as a barrier that can impair or prevent achieving a desired bond with the TSP material. Thus, the removal of such oxide materials by reaction with the braze material operates to improve the wetability of the TSP material, thereby helping to achieve a desired degree of bond strength therebetween.

In addition to the properties of being active or nonactive, braze materials used to form TSP constructions of this invention can be selected based on their characteristic liquid (liquidus) or solid/crystallization (solidus) temperatures, as will be described in greater detail below, for the purpose of facilitating forming the TSP constructions in a manner that intentionally reduces or eliminates the formation of voids and/or residual thermal stresses in the resulting construction, which will be better described below. Additionally, when TSP constructions of this invention are to be attached to an end use application device by welding or brazing technique, it is also desired that the braze material selected being one having a liquidus temperature that is higher than the welding or brazing temperature used to attach the construction. In an example embodiment, where the TSP construction is provided in the form of a cutting element for attachment on a bit for drilling subterranean formations, it is desired that the braze material have a liquidus/solidus temperature that is above that used to join conventional cutting elements having WC—Co substrates to such drill bits.

Figure 2B:
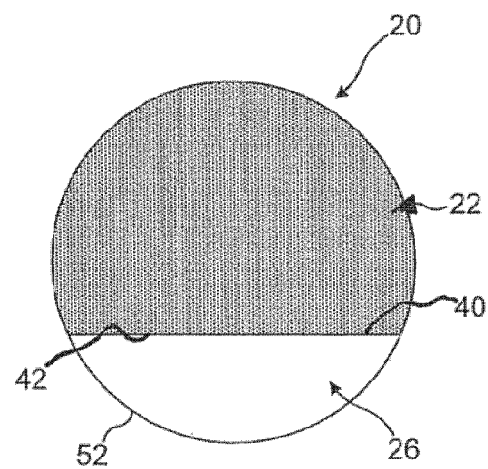
Figure 2C:
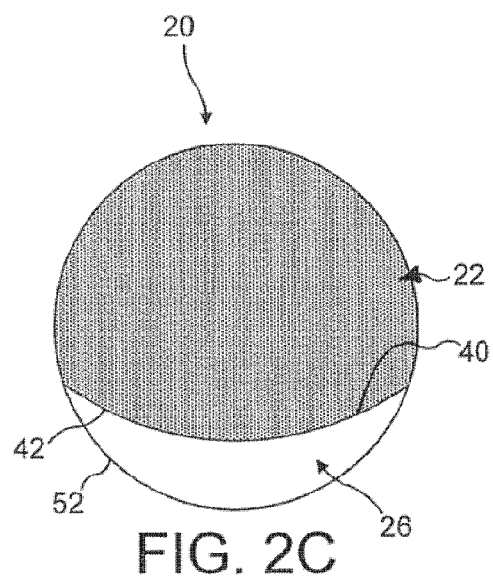
Figure 2D:
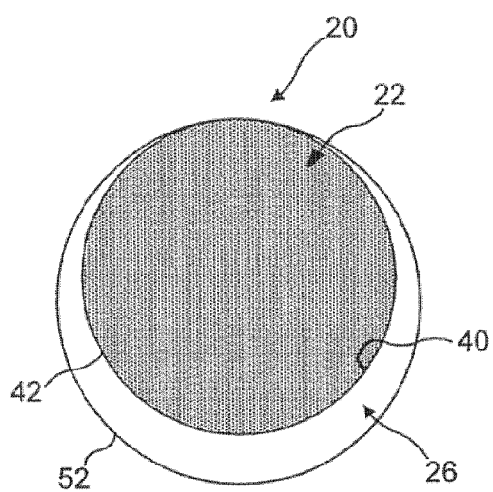

As best shown in FIGS. 2B, 2C and 2D, the interface between the sidewall support member 26 and the TSP material 22 and backside support member (not shown) can be configured differently depending on such factors as the types of materials used to form the TSP material and the support members, as well as the particular end use for the TSP construction of this invention. FIG. 2B, for example, illustrates the TSP construction 20 of FIG. 2A comprising a sidewall support member 26 configured having a cylindrical outside wall surface 52, and a planar inside wall surface 40 that is sized and shaped to support a planar TSP material inside wall surface 42.

The interface geometry illustrated in FIG. 2B is one that is planar between the TSP material and the support member 26. It is to be understood that the TSP construction comprising such a planar interface can be configured with the support member 26 occupying a larger or smaller amount of the overall construction diameter. For example, the TSP construction comprising such a planar interface can, for purposes of manufacturing efficiency, be configured with the interface disposed diametrically across a center of the construction. Configured in this manner, manufacturing efficiency can be increases as two TSP material components can be formed at the same time from a single blank FIG. 2C, for example, illustrates a TSP construction 20 comprising a sidewall support member 26 configured having a cylindrical outside wall surface 52, and a nonplanar inside wall surface 40 and interface with the TSP material. In this particular embodiment, the sidewall support member inside wall surface 40 is concave and is sized and shaped to support a convex TSP material inside wall surface 42. The interface geometry illustrated in FIG. 2B may be desired in certain applications calling for some intrinsic lateral support at the interface FIG. 2D, for example, illustrates another TSP construction 20 comprising a sidewall support member 26 that is configured having a cylindrical outside wall surface 52 and having a nonplanar interface with the TSP material. In this particular embodiment, the sidewall support member has an inside wall surface 40 that extends circumferentially around a majority of the TSP wall surface 42. The interface geometry illustrated in FIG. 2B may be desired in for example in certain applications calling for a high degree of bond strength for the TSP material in the construction. Thus, in this example embodiment, the interfacing surfaces of the TSP material and sidewall support member are configured in a manner providing a high degree of surface area along the interface to further enhance the bond strength therebetween. Additionally, this interface configuration may provide some compressive radial residual stresses that could operate to enhance cutter performance.

These are but a few example TSP construction embodiments illustrating different TSP material-to-sidewall support member interfaces that been provided for purposes of reference. It is, therefore, understood that TSP constructions having planar or nonplanar interface geometries other than those specifically described or illustrated are within the scope of this invention. Additionally, while the interface geometry for the TSP material and sidewall support member has been discussed and illustrated, it is to be understood that the interface geometry between the TSP material and the backside support can also vary and can be planar or nonplanar, depending on the particular end use application. It is also to be understood that the above-described interface geometries between the TSP material and the support members apply to all embodiments of the TSP construction discussed and illustrated herein.

Figure 3A:
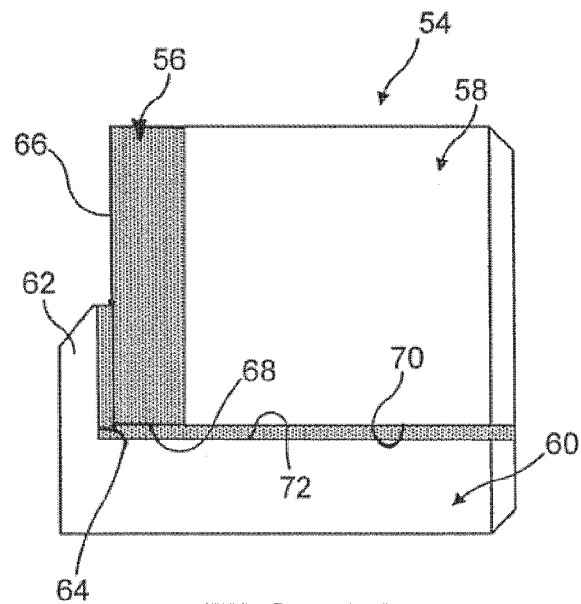
FIGS. 3A to 3H are cross-sectional side, perspective, and top plan views of another example embodiment thermally stable polycrystalline ultra-hard construction of this invention comprising a sidewall support member having an integral front support element.

FIGS. 3A to 3H illustrate another example embodiment TSP construction 54 of this invention generally comprising a TSP material 56 that, like the embodiment described above and illustrated in FIGS. 2A to 2D, is attached both to a backside support member 58 and a sidewall support member 60. Referring to FIG. 3A, a difference however is that the sidewall support member 60 is configured having a third support member in the form of a front support element 62 that extends radially inwardly from the sidewall support member 60. The front support element 62 includes a backside surface 64 that is positioned across and attached to a region of the TSP material front side surface 66. In this particular embodiment, the front support element 62 is an integral part of the sidewall support member, i.e., the sidewall support member and the front support element are provided in the form of a one-piece construction.

Configured in this manner, the sidewall support member 60 operates to not only provide radial support for both the interfacing TSP material inside wall surface 68 and backside support inside wall surface 70, but works in conjunction with the backside support 58 to provide axial support for the TSP material 56 along its front side surface 66. Thus, a feature of this embodiment is that the front support element 62 operates to further enhance the attachment between the TSP material and the support members, thereby helping to improve the bond strength and service life of the construction. Further, in an end use application such as drilling or the like the presence of the front support element can operate to shield the TSP material from some types of impacts, such as when encountering downhole junk/debrazed cutters or the like.

In this example embodiment, the backside support member 60 is configured as described above for the embodiment illustrated in FIGS. 2A to 2D, and the sidewall support member includes an inside wall surface 72 that is attached to both the TSP material inside wall surface 68 and the backside support member inside wall surface 70. The inside wall surface 72 of the sidewall support member is sized and configured to support the entire TSP material inside wall surface 72, and at least a region of the backside support member inside surface 70. The sidewall support member axial length, extending from the front support element 62 along the backside support member 58, can vary depending on the particular TSP construction and end use application, e.g., the sidewall support can extend wholly or partially along the backside support as called for by the particular end use application.

Figure 3B:
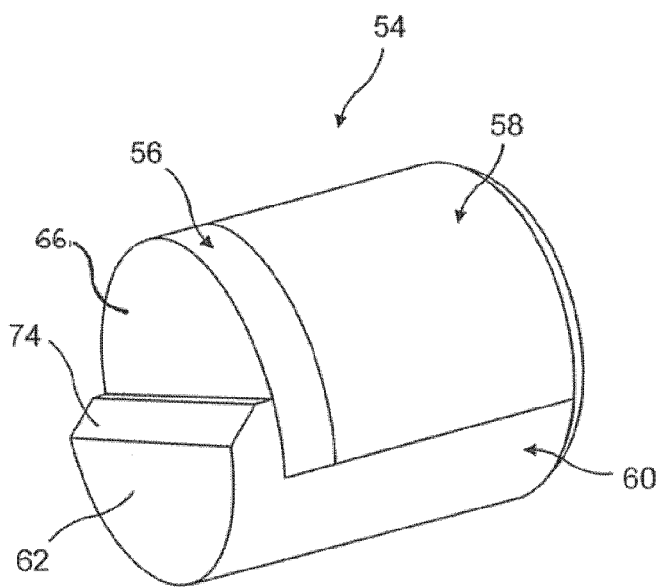

FIG. 3B illustrates a perspective view of the TSP construction 54 of FIG. 3A illustrating the TSP material 56 as it is interposed axially between the front support element 62 of the side wall support member 60 and the backside support member 58, and as it is supported radially by the sidewall support member 60. In this example embodiment, the front support element 62 extends radially inwardly across a partial region of the TSP material front side surface 66, leaving a remaining portion of the TSP material front side surface exposed.

The extent that the front support element 62 extends over the TSP material front side surface 66 can and will vary depending on the particular end use application. It is generally desired that the front support element extend radially a sufficient distance along the TSP material front side surface to provide a desired degree of support and attachment area with the TSP material while also not interfering with a region of the front side surface that is adjacent the a working surface of the TSP construction. In an example embodiment, it is desired that the front support element extend over the TSP material to cover at least about 5 percent of the TSP material front side surface area, and more preferably at least about 10 percent of the TSP material front side surface area. However, for certain applications calling for a desired degree of protection of the TSP material front side surface, the front support element may extend to cover a larger surface area of the front side surface. For example, in such applications, it may be desired that the front support member cover at least 50 percent of the TSP material front side surface. In certain applications, it may be desired that the front support member be configured to cover the entire TSP material front side surface.

In an example embodiment, the front support element 62 is configured having a lip 74 that provides a transition between a front side surface of front support element and the TSP material front side surface. The lip 74 can have an outer surface that is beveled or rounded to provide an eased transition between the outer surfaces of the interfacing front support element 62 and the TSP material to minimize impairment or interruption of cutting debris or hydraulic fluid that is passed thereover during cutting or wear operation.

In the example embodiments illustrated in FIGS. 3A and 3B, the sidewall support member 60 is configured to extend along the entire backside support member inside wall surface 70. The backside and sidewall support members 58 and 60, and the front support element 62, are each attached to the TSP material in the same manner as described above, i.e., by the use of a suitable brazing material.

Figure 3C:
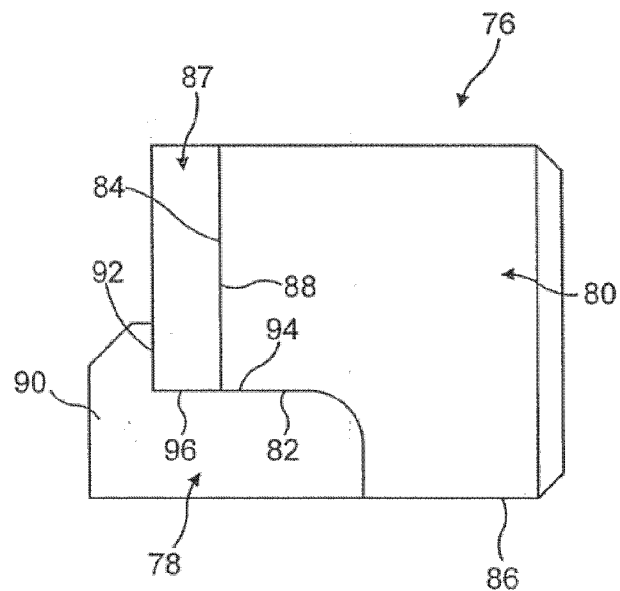
Figure 3D:
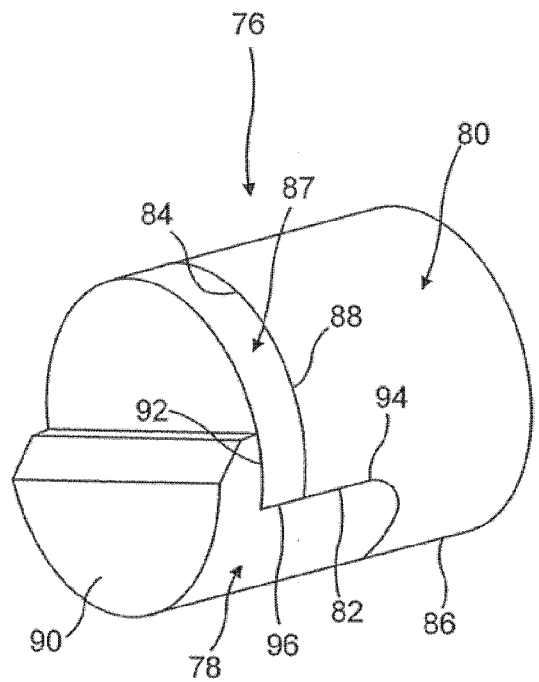

FIGS. 3C and 3D illustrate another example embodiment TSP construction 76 that is configured in a manner similar to that described above for the TSP constructions of FIGS. 3A and 3B, except that the sidewall support member 78 is configured having an axial length that extends along a partial length of the backside support member 80. In this particular embodiment, the backside support member 80 is configured having a recessed inside wall surface 82 that extends axially a distance from a front side surface 84, and that transitions radially outwardly to an outside wall surface 86 of the backside support member.

In this embodiment, the backside support member front side surface 84 is configured to match the TSP material 87 backside surface 88 to provide a desired attachment therebetween, and the sidewall support member is configured having both a front support element 90 that is attached with the TSP front side surface 92 and an inside wall surface 94 that is attached with TSP material inside wall surface 96 and the backside support recessed inside wall surface 82. This particular TSP construction embodiment can be used for those less demanding cutting and/or wear applications that may not call for such a high degree of improved bond strength. In an example embodiment, it is desired that the sidewall support member extend axially along the backside support for at least about 10 percent of the total backside support length or thickness to provide a desired minimum degree of support, and preferably greater than about 20 percent of the total backside support length.

As described above and illustrated in FIGS. 2B to 2D, the interface between the sidewall support member and the TSP material and/or backside support inside wall surfaces can be planar or nonplanar, depending upon the particular use application. The same use of planar or nonplanar interfaces between the TSP material and the support members are understood to apply to the TSP constructions illustrated in FIGS. 3A to 3D.

Figure 3E:
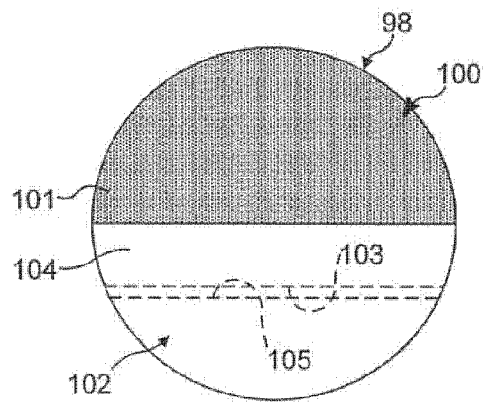

FIGS. 3E to 3H illustrate top or plan views of different embodiments of the TSP construction illustrated described above and illustrated in FIGS. 3A to 3B. FIG. 3E, illustrates the example TSP construction 98 of FIGS. 3A to 3D, wherein the TSP material 100 is attached along a front side surface 101 with a sidewall support member 102 front support element 104, and is attached along an inside wall surface 103 with the sidewall support member inside wall surface 105. In this example embodiment, the front support element 104 extends diametrically across a region of the TSP material front side surface 101. The region between the interfacing TSP and sidewall support member inside wall surfaces comprises the braze material.

Figure 3F:
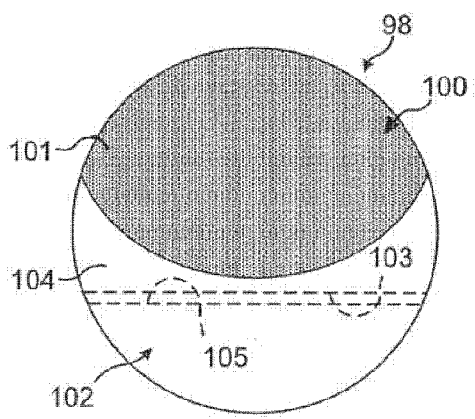

FIG. 3F illustrates another example embodiment TSP construction 98, wherein the TSP material 100 is attached along a front side surface 101 with a sidewall support member 102 front support element 104, and is attached along an inside wall surface 103 with the sidewall support member inside wall surface 105. In this particular example embodiment, the front support element 104 is configured having a concave profile that extends across a region of the TSP material front side surface 101. The region between the interfacing TSP and sidewall support member inside wall surfaces comprises the braze material.

Figure 3G:
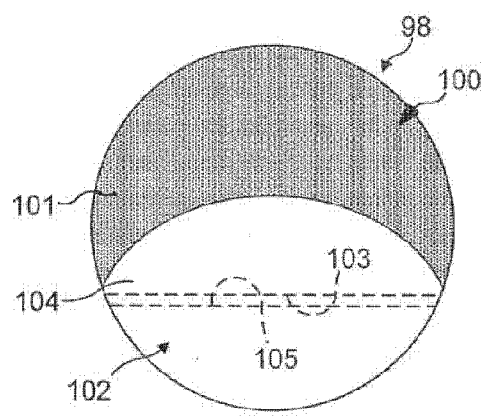

FIG. 3G illustrates another example embodiment TSP construction 98, wherein the TSP material 100 is attached along a front side surface 101 with a sidewall support member 102 front support element 104, and is attached along an inside wall surface 103 with the sidewall support member inside wall surface 105. In this particular example embodiment, the front support element 104 is configured having a convex profile that extends across a region of the TSP material front side surface 101. The region between the interfacing TSP and sidewall support member inside wall surfaces comprises the braze material.

Figure 3H:
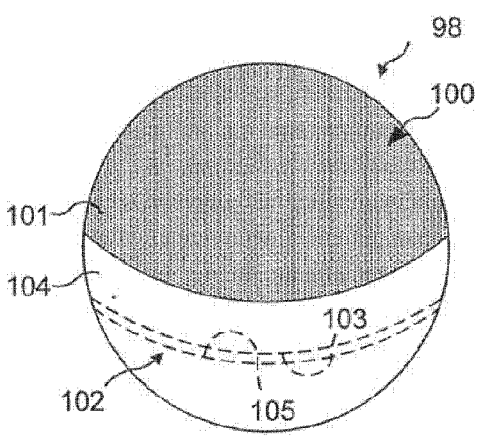

In each of the example TSP construction embodiments illustrated in FIGS. 3E to 3G, the interface between the TSP material and the sidewall support member has been a planar. FIG. 3H illustrates an example embodiment TSP construction 98 comprising a nonplanar TSP material and sidewall support member interface. In this embodiment, the TSP material 100 is attached along a front side surface 101 with a sidewall support member 102 front support element 104, and is attached along an inside wall surface 103 with the sidewall support member inside wall surface 105.

In this particular example embodiment, the front support element 104 is configured having a concave profile that extends across a region of the TSP material front side surface 101, and having a nonplanar interface between the TSP material and backside support inside wall surfaces. In this particular embodiment, the TSP material inside wall surface 103 is configured having a convex shape, and the backside support member inside wall surface 105 is configured having a complementary concave shape. The region between the interfacing TSP and sidewall support member inside wall surfaces comprises the braze material. Although a particular nonplanar interface between the TSP material and backside support member has been described and illustrated for this example embodiment, it is to be understood that other nonplanar interface configurations are intended to be within the scope of this invention.

Figure 4:
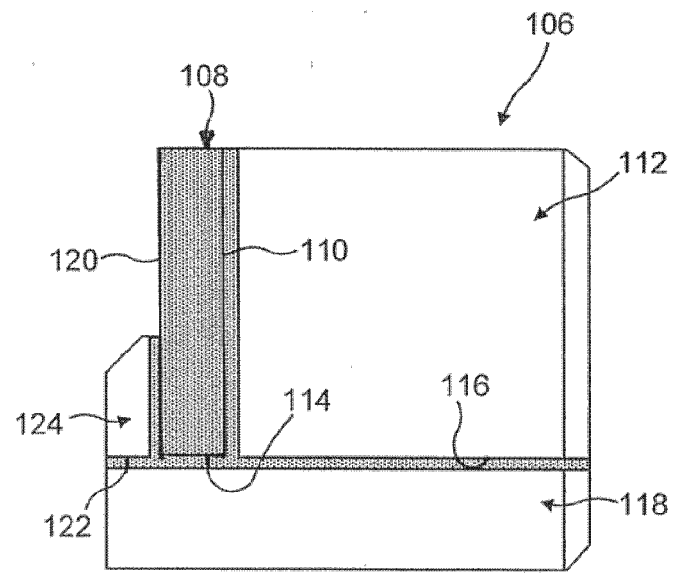
FIG. 4 is a cross-sectional side view of a further example embodiment thermally stable polycrystalline ultra-hard construction of this invention comprising separate sidewall support and front support members.

FIG. 4 illustrates another example embodiment TSP construction of this invention that is somewhat similar to that described above and illustrated in FIGS. 3A and 3B in that it includes a third or front support member or element that attaches to a front side surface of the TSP material. However, the front support member or element is not an integral part of the backside support member. The TSP construction of this embodiment comprises a TSP material 108 that is supported along a backside surface 110 by a backside support member 112, and both the TSP material and the backside support member are supported along respective inside surfaces 114 and 116 by the sidewall support member 118.

In this particular embodiment, the sidewall support member 118 extends axially a distance beyond the TSP front side surface 120 to accommodate placement of and attachment with an inside wall surface 122 of a front support member 124. The front support member 124 in this embodiment is separate from the sidewall support member 118 and is configured to extend a distance radially inwardly from the sidewall support member to cover and attach with a desired region of the TSP material front side surface 120. Thus, this TSP construction embodiment comprises three different support members. The TSP material 108 is attached to the backside support member 112, the sidewall support member 118, and the front support member 124 by use of a braze material described above.

Figure 5:
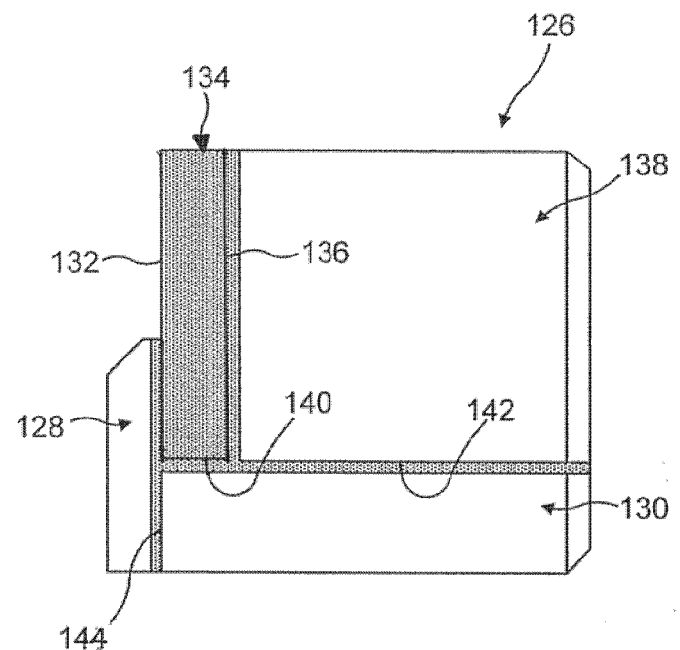
FIG. 5 is a cross-sectional side view of a further example embodiment thermally stable polycrystalline ultra-hard construction of this invention comprising a separate sidewall and front support members.

FIG. 5 illustrates another example embodiment TSP construction 126 of this invention that is somewhat similar to that described above and illustrated in FIG. 4 in that it includes a front support member 128 that is separate from the side support member 130 and that is positioned over and attached to a region of the front side surface 132 of the TSP material 134. The TSP material 134 is supported along a backside surface 136 by a backside support member 138, and both the TSP material and the backside support member are supported along respective inside surfaces 140 and 142 by the sidewall support member 130.

In this particular embodiment, the sidewall support member 130 is configured having an axial end surface 144 that is coplanar with the TSP material front side surface 132. The front support member 128 is configured to extend radially inwardly a distance from its interface with the sidewall support member to cover a desired region of the TSP material front side surface 132. Like the TSP construction described above and illustrated in FIG. 4, the TSP construction of this embodiment comprises three different support members, and the TSP material 134 is attached to the backside support member 138, the sidewall support member 130, and the front support member 128 by use of a braze material described above.

TSP constructions of this invention comprise two or more support members that are specially configured to attach with the TSP material to help improve the bond strength of the TSP material within the construction. The support members are configured to both fit together with one another and with the TSP material in manner that enables movement of the support members relative to one another and relative to the TSP material during the attachment process to avoid the unwanted formation of gaps or voids, thereby operating to minimize or eliminate the unwanted presence of residual thermal stresses within the construction, and to minimize or eliminate the presence of any unwanted stress concentrations within the construction that can occur during operation of the TSP construction.

For example, in the TSP construction embodiments illustrated in FIGS. 2A to 2D, the TSP material is attached to both the backside support member and sidewall support member. The use of the sidewall support member in this embodiment in addition to the backside support member operates to provide an additional point of attachment with an inside wall surface of the TSP, that operates to improve the attachment strength between the TSP material and the support. Further, the use of the sidewall support member operates to minimize or eliminate the presence of unwanted stress being concentrated at the corner of the TSP material positioned between its backside and inside wall surfaces. Conventional thermally stable polycrystalline diamond compact constructions having only a backside support member are known to suffer from internal stresses that are concentrated at or adjacent this corner.

Additionally, the use of two support members that are movable relative to one another and relative to the TSP material operates to minimize or eliminate the formation of unwanted residual thermal stresses in the construction caused during the attachment process. When the attachment between the support members and/or the TSP material is provided by a braze material during a brazing process, the braze material is known to undergo a certain degree expansion. Using two or more support members in forming TSP constructions of this invention enables a desired degree of movement to take place amongst the TSP material and support members during the brazing process to thereby avoid or minimize formation of unwanted thermal stresses within the construction.

The TSP construction embodiments illustrated in FIGS. 4 and 5 FIGS. 2A to 2D are ones that comprise three support members. The use of three support members operates to further improve the attachment strength between the TSP material within the construction. Additionally, the use of three support members operates to further improve the degree to which the support members can move relative to one another and relative to the TSP material during the brazing process, thereby further enhancing the ability to minimize or eliminate the occurrence of unwanted residual thermal stress within the construction.

TSP constructions of this invention can be formed using a single type of braze material to braze together the support members and/or the TSP material. In an example embodiment, an active braze material can be used to braze both the TSP material to the two or more support members as well as braze together the support members. It is to be understood that the specific type of braze material used as the single type of braze material to attach the construction can and will vary depending on such factors as the type of TSP material, the type of material used to form the support members, and the ultimate end use application.

Alternatively, TSP constructions of this invention can be formed using two or more different types of braze materials. For example, a first type of braze material can be used to join the TSP material to one support member, while another type of braze material can be used to join one support member to another support member. In such example, it may be desirable to use an active braze material to join the TSP material to one support member, and use a nonactive braze material to join the support members together. In this example, the active braze material will react with and form a strong bond with the TSP material, which is desired for the purpose of improving the bond strength of the TSP material within the TSP construction.

The different braze materials used in such TSP construction embodiment can be selected on the basis of the braze being active or nonactive and/or on the melting (liquidus) temperatures and/or solidifying (solidus) or crystallizing temperatures of the braze materials. For example, it may be desirable to use a braze material having a relatively high melting temperature (high crystallization temperature) for joining the TSP material to a support member, and use relatively lower melting temperature (lower crystallization temperature) braze material for joining the support members together. During the brazing process the braze material is heated to its melting temperature while the components to be brazed together are held in an assembled state. Once melted, the braze material infiltrates and fills the spaces between the components, after which time the braze material is allowed to cool. During the cooling process, the braze material undergoes crystallization, that causes an expansion of the braze material.

In this example, selecting a higher melting temperature braze material to attach the TSP material to a support member will cause such braze material to crystallize first during cooling while the relatively lower melting temperature braze material is still in a liquid phase. This selective choice of using different melting temperature braze materials enables the TSP material to be attached to the support member without resistance from the other support members, which resistance to movement can cause an unwanted formation of residual thermal stress within the construction. As the assembly continues to cool, the lower melting point braze material undergoes crystallization and forms a desired attachment between the support members. Thus, a feature of TSP constructions of this invention is that they permit the selective use of different types of braze materials to both provide an improved bond strength with the TSP material and further avoid the unwanted creation of residual thermal stresses within the TSP construction.

Thus, it is to be understood that the TSP constructions described herein and illustrated in the figures can be formed using a single type of braze material or using two or more different braze materials. For example, referring to FIG. 2A, a first braze material can be used to attach the TSP material 28 to the backside support 24, while a second braze material can be used to both attach the TSP material to the sidewall support 26 and attach the backside support to the sidewall support. The first braze material can be an active material and the second a nonactive material, and/or the first braze material can have a relatively higher melting point than the second braze material. Referring to FIG. 3A, the same braze materials can be used as described above for FIG. 2A, and in addition one of the first or second braze materials, or a third braze material, can be used to attach the front support element 62 to the TSP material 56. The braze material used to attach front support element to the TSP material can be active or nonactive, and/or can have a melting temperature that is different or the same as the braze material used to attach the TSP material to the backside support.

As noted above, it is to be understood that a number of different possible TSP constructions can be formed having a variety of different types of braze materials providing attachments between a number of different adjacent TSP material and support member surfaces, and that all such available variations formed by using such different braze materials are within the scope of this invention.

The support members used for forming TSP constructions of this invention can be formed from materials that are capable of providing a desired level of structural strength and rigidity to enable attachment and use of the construction with a desired cutting and/or wear device. It is also desired that the support members be formed from a material having properties that facilitate attachment to one another and to the TSP material by brazing process or the like. Further, it is desired that the material selected to form the support members facilitate the TSP construction to be attached to the end use cutting and/or wear device by conventional method, e.g., by brazing or welding or the like. In an example embodiment, the material used to form the support members is one that does not include a constituent that will infiltrate into the TSP material during the brazing or attachment process and act as a catalyst for the TSP material.

Suitable materials useful for making support members include, and are not limited to, carbides, nitrides, carbonitrides, ceramic materials, metallic materials, ultra-hard materials such as those including diamond and/or cubic boron nitride components, cermet materials, and mixtures, combinations, and alloys thereof. Materials useful for forming the support members can be selected from the same general types of materials used to form substrates for conventional PCD materials, or used to form substrates for conventional thermally stable polycrystalline diamond compact constructions, including cermet materials such as cemented tungsten carbide.

In addition to having the ability to use different brazing materials, TSP constructions of this invention can be formed having support members made from the same or different materials. For example, TSP constructions of this invention can be formed having support members that are all formed from the same material, or having one or more support member formed from a material that is different from that of another support member in the same TSP construction. The ability to use support members formed from different types of materials provides a further method for providing TSP constructions having properties of improved bond strength and reduced residual thermal stress.

For example, it may be desirable to form the backside support member from a material having a thermal expansion characteristic and/or elastic moduli that more closely matches that of the TSP material to minimize the formation of thermal expansion stresses during brazing and during operation. It may also be desired in certain applications to form the sidewall support member from a material that will facilitate attachment with the end use cutting and/or wear device. In an example embodiment, it may be desirable that the backside support member be formed from a material such as cemented tungsten carbide having a low cobalt content, to minimize the difference in thermal expansion with the TSP material, and the sidewall support member be formed from a material such as cemented tungsten carbide having a higher cobalt content to facilitate attachment by brazing with the end use cutting and/or wear device.

Additionally, for those TSP constructions comprising a front support element or front support member, it may be desirable that such front support element or member be formed from a material having a high degree of hardness and/or wear resistance, as such support member can be positioned in close proximity to a working surface of the TSP construction. In an example embodiment, the front support member can be formed from an ultra-hard material comprising such materials as diamond, polycrystalline diamond, cubic boron nitride, polycrystalline cubic boron nitride, or mixtures thereof.

When using the term "different" in reference to materials used to form both the braze material and the support members, it is to be understood that this includes materials that generally include the same constituents, but may include different proportions of the constituents and/or that may include differently sized constituents, wherein one or both such features operate to provide a different mechanical and/or thermal property in the material.

Thus, TSP constructions of this invention are specially engineered to include two or more support members, that can be made from the same or different material, and that can be attached to one another and to a TSP material using the same or a different braze material. TSP constructions of this invention enable a designer to vary one or more of these features for the purpose of achieving a desired improvement in bond strength, and/or a desired reduction in residual thermal stress, and/or a desired reduction in stress concentrations within the construction to meet the needs of a particular end use application. Further, TSP constructions of this invention comprising such support members enable such constructions to be attached by conventional methods, such as by brazing, welding or the like, to a variety of different end use application devices.

TSP constructions of this invention can be used in a number of different applications, such as tools for mining, cutting, machining, milling and construction applications, wherein the combined properties of thermal stability, wear and abrasion resistance, mechanical strength, reduced thermal residual stress, and reduced stress concentrations are highly desired. TSP constructions of this invention are particularly well suited for forming working, wear and/or cutting elements in machine tools and drill and mining bits such as roller cone rock bits, percussion or hammer bits, diamond bits, and shear cutters used in subterranean drilling applications.

Figure 6:
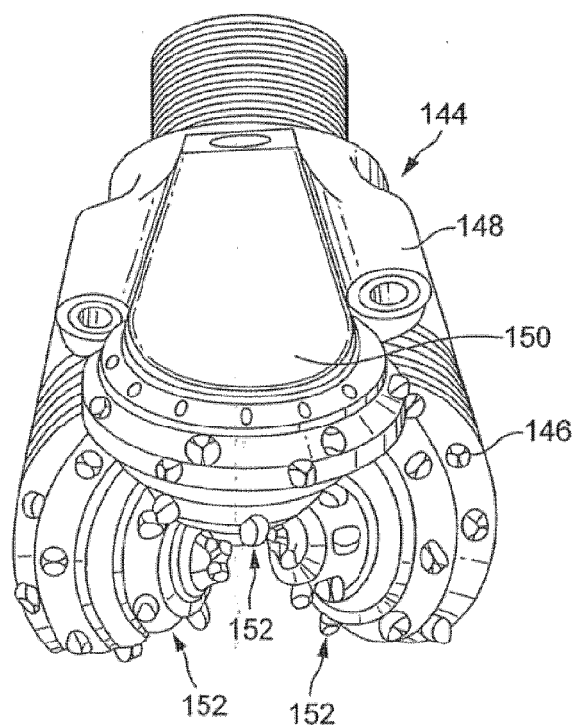
FIG. 6 is a perspective side view of a roller cone drill bit comprising a number of thermally stable polycrystalline ultra-hard constructions provided in the form of inserts.

FIG. 6 illustrates a rotary or roller cone drill bit in the form of a rock bit 144 comprising a number of the TCP constructions provided in the form of wear or cutting inserts 146. The rock bit 144 comprises a body 148 having three legs 150, and a roller cutter cone 152 mounted on a lower end of each leg. The inserts 146 can be formed according to the methods described above. The inserts 146 are provided in the surfaces of each cutter cone 152 for bearing on a rock formation being drilled.

Figure 7:
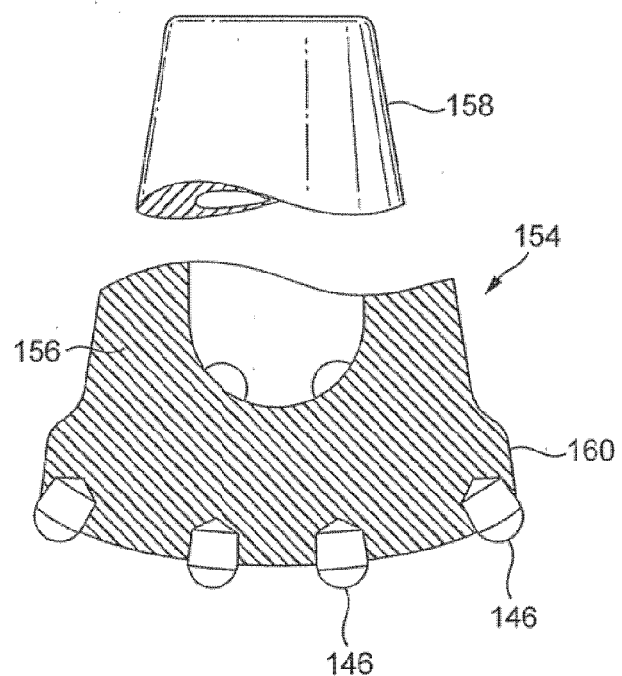
FIG. 7 is a perspective side view of a percussion or hammer bit comprising a number of thermally stable polycrystalline ultra-hard constructions provided in the form of inserts.

FIG. 7 illustrates the inserts described above as used with a percussion or hammer bit 154. The hammer bit comprises a hollow steel body 156 having a threaded pin 158 on an end of the body for assembling the bit onto a drill string (not shown) for drilling oil wells and the like. A plurality of the inserts 146 are provided in the surface of a head 160 of the body 156 for bearing on the subterranean formation being drilled.

Figure 8:
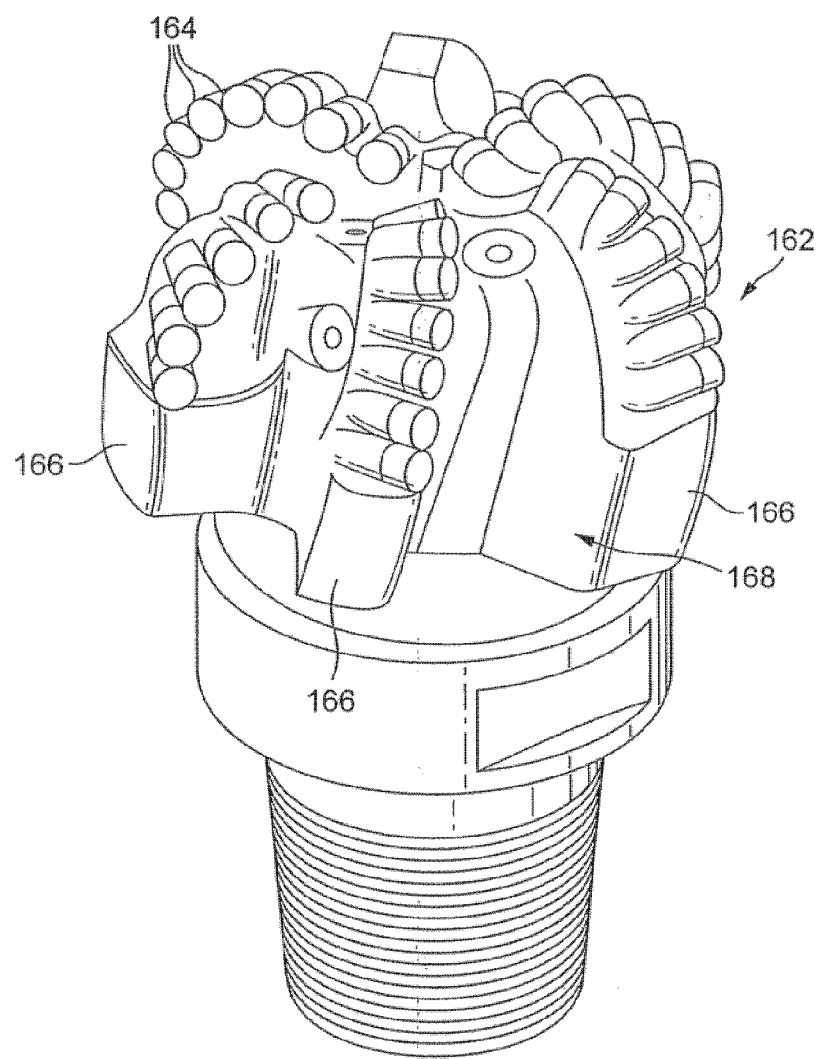
FIG. 8 is a perspective side view of a drag bit comprising a number of thermally stable polycrystalline ultra-hard constructions provided in the form of shear cutters.

FIG. 8 illustrates a drag bit 162 comprising a plurality of cutting elements provided in the form of shear cutters 164 formed from TCP constructions of this invention. The shear cutters 164 are each attached to blades 166 that extend from a head 168 of the drag bit for cutting against the subterranean formation being drilled.

Other modifications and variations of TSP constructions comprising a TSP material and two or more support members formed from the materials and attached together in the manner described above will be apparent to those skilled in the art. It is, therefore, to be understood that within the scope of the appended claims, this invention may be practiced otherwise than as specifically described.

What is claimed is:

1. A method of making a thermally stable polycrystalline construction comprising the steps of:

combining a body with a first support member and a second support member to form an assembly, the body comprising a thermally stable polycrystalline ultra-hard material, said thermally stable polycrystalline ultra-hard material comprising a polycrystalline ultra-hard material selected from the group of materials consisting essentially of polycrystalline ultra-hard materials having a substantial amount of a catalyst in said polycrystalline ultra-hard materials removed and polycrystalline ultra-hard materials not including a metal solvent catalyst;

placing a first braze material between the body and the first support member, and placing a second braze material between the second support member and the body and first support member, wherein the second braze material comprises a first region of braze material extending radially over at least a portion of the body and a second region of braze material adjacent the first support member, and wherein the first braze material is different from the second region of second braze material;

heating the combined assembly and the braze materials to an elevated temperature; and cooling the combined assembly and the braze materials to cause crystallization of the braze materials, and to cause the braze materials to form an attachment between the body and the first support member, and between the body and the second support member and the first support member and the second support member.

2. The method as recited in claim 1 wherein the body further comprises a plurality of empty voids interposed within the polycrystalline ultra-hard material.

3. The method as recited in claim 1 wherein the body further comprises at least a population of voids comprising a reaction product with the polycrystalline ultra-hard material.

4. The method as recited in claim 1 wherein during the step of cooling, one of the first braze material or the second region of second braze material crystallizes before the other.

5. The method as recited in claim 1 wherein during the step of heating, the first braze material reacts with the body to form a reaction product therewith.

6. The method of claim 5 wherein the reaction product is silicon carbide.

7. The method of claim 1 wherein the first braze material is an active braze material and the second region of the second braze material is a nonactive braze material.

8. The method as recited in claim 1 further comprising, during the step of combining, combining the body with a front support member, wherein front support member is attached to a region of the front side surface of the body during the heating and cooling steps through the use of a third braze material.

9. The method as recited in claim 8 wherein the front support member is an integral part of the second support member.

10. The method as recited in claim 8 wherein the third braze material is the same as the first braze material.

11. The method as recited in claim 1 wherein the first support member and the second support member are formed from different materials.

12. The method as recited in claim 1 wherein the second support member has an axial length that extends the entire distance along the first support member.

13. A method of making a thermally stable polycrystalline construction comprising the steps of:

combining a body with a backside support member, a sidewall support member, and a front support member to form an assembly, the body being formed of a thermally stable polycrystalline ultra-hard material, said thermally stable polycrystalline ultra-hard material comprising a polycrystalline ultra-hard material selected from the group of materials consisting essentially of polycrystalline ultra-hard materials having a substantial amount of a catalyst in said polycrystalline ultra-hard materials removed and polycrystalline ultra-hard materials not including a metal solvent catalyst, and wherein the polycrystalline ultra-hard material of the body has a front side surface, a backside surface, and an inside wall surface;

placing a first braze material between the backside surface of the body and the backside support member, placing a second braze material between the sidewall support member and the inside wall surface of the body and the backside support member, and placing a third braze material between the front side surface of the body and the front support member, wherein at least a portion of said front support member extends in front of said front surface, and wherein at least a portion of said backside support member extends behind said backside surface;

heating the combined assembly and the braze materials to an elevated temperature; and cooling the combined assembly and the braze materials to cause crystallization of the braze materials, and to cause the braze materials to form an attachment between the body, the backside support member, the sidewall support member and the front support member.

14. The method as recited in claim 13 wherein the body further comprises a plurality of empty voids interposed within the polycrystalline ultra-hard material.

15. The method as recited in claim 13 wherein the body further comprises at least a population of voids comprising a reaction product with the polycrystalline ultra-hard material.

16. The method as recited in claim 13 wherein the front support member is an integral part of the sidewall support member and extends radially inwardly therefrom.

17. The method as recited in claim 13 wherein the front support member covers at least 10 percent of the body front side surface.

18. The method as recited in claim 13 wherein the front support member covers at least 50 percent of the body front side surface.

19. The method as recited in claim 13 wherein the first, second and third braze materials are the same.

20. The method as recited in claim 13 wherein the backside support member, the sidewall support member and the front support member are formed from the same materials.

21. The method as recited in claim 20 wherein the materials comprise tungsten carbide.

22. The method as recited in claim 13 wherein the backside support member has a cobalt content that is less than that of the sidewall support member.

23. The method as recited in claim 13 wherein the sidewall support member has an axial length that extends the entire distance along the backside support member.

24. The method as recited in claim 1 wherein the body comprises a peripheral surface and the support member comprises a peripheral surface and wherein placing a second braze material between the second support member and the body and first support member comprises placing the first region of the second braze material in contact with the body peripheral surface and in contact with the second support member and placing the second region of the second braze material in contact with the first support member peripheral surface and in contact with the second support member.

25. The method as recited in claim 13 wherein combining a body comprises sandwiching at least a portion of the body between the backside support member and the front support member.

26. The method as recited in claim 13 wherein the sidewall support member extends from the front support member axially along the backside support member.

27. The method as recited in claim 13 wherein placing the third braze material comprises placing the third braze material in contact with front side surface of the body and in contact with the front support member.

28. The method as recited in claim 1 wherein the construction comprises a longitudinal axis, wherein the body peripheral surface is defined about said longitudinal axis, wherein at least a portion of said peripheral surface is circular about said longitudinal axis, wherein the first support member peripheral surface is defined about said longitudinal axis, and wherein at least a portion of said first support member peripheral surface is circular about said longitudinal axis.

* * * * *